April 30, 1968  W. M. FLOOK, JR  3,381,265
COMPRESSIONAL WAVE TRANSDUCER
Filed April 24, 1963  2 Sheets—Sheet 1
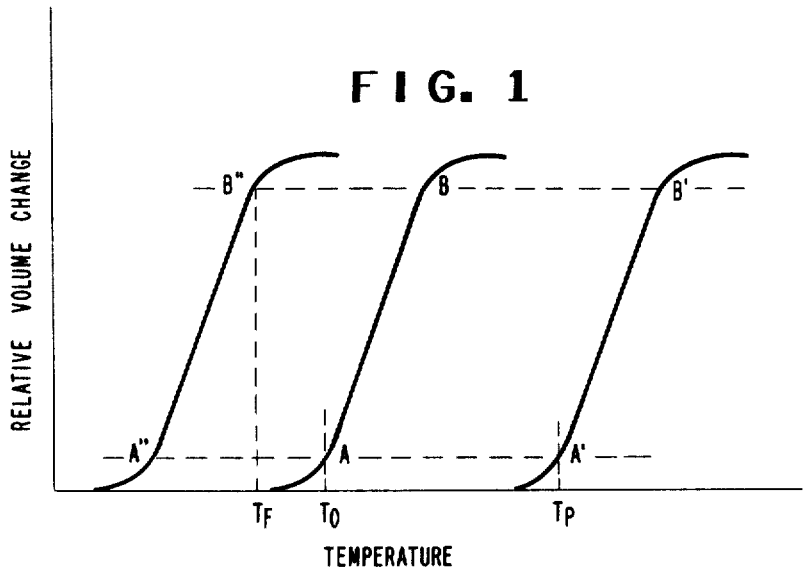
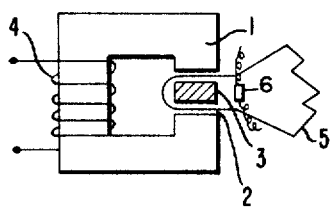
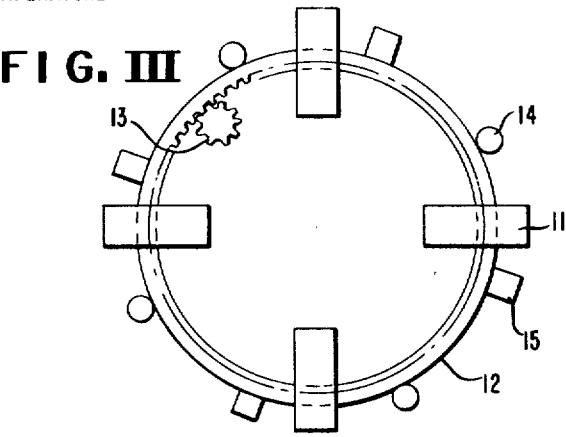
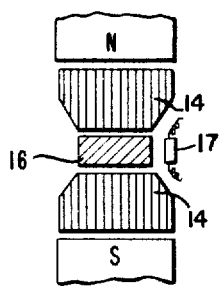
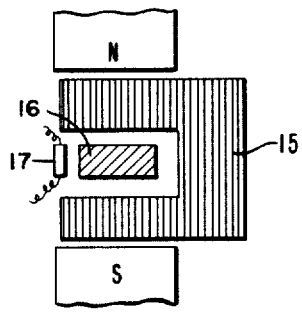
INVENTOR
WILLIAM M. FLOOK, JR.
BY
*C. Harold Herr*
ATTORNEY

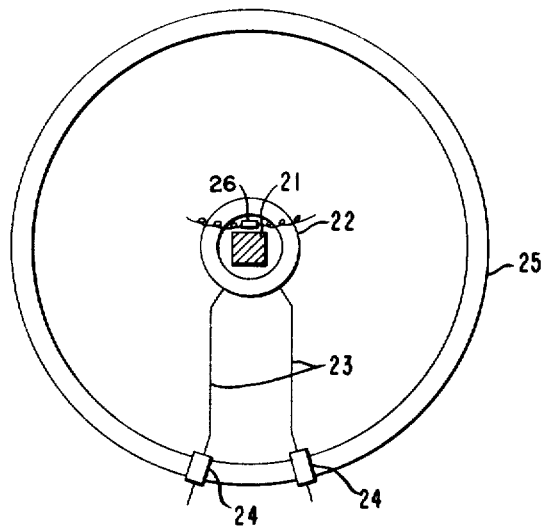
FIG. VI
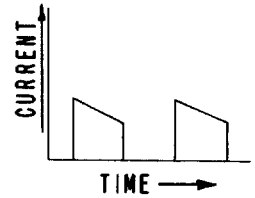
FIG. VII
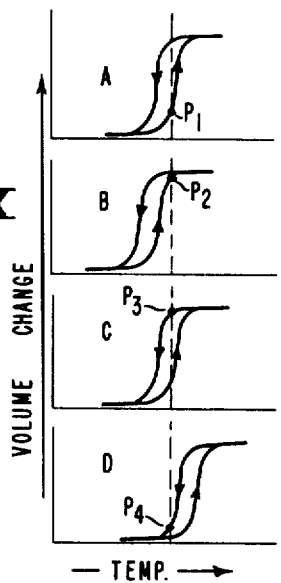
FIG. IX
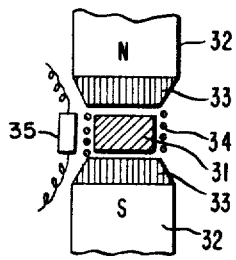
FIG. VIII

United States Patent Office 3,381,265
Patented Apr. 30, 1968

3,381,265
COMPRESSIONAL WAVE TRANSDUCER
William M. Flook, Jr., Wilmington, Del., assignor to E. I.
du Pont de Nemours and Company, Wilmington, Del.,
a corporation of Delaware
Filed Apr. 24, 1963, Ser. No. 275,364
14 Claims. (Cl. 340—10)

This invention relates to compressional wave transducers in general and to their use, and more particularly concerns compressional wave transducers suitable for use in deep water.

In recent years sound transducers for use in liquid media have been employed in a variety of applications including submarine detection, studies of sounds emitted by marine life, determination of liquid level in inaccessible containers and, for the ultrasonic range of frequencies, in the preparation of dispersions, detection of flaws in solids, and treatment of various physiological conditions. The advent of deep running nuclear submarines has brought about an urgent need for greater detection ranges and for equipment operable at substantial depth. Echo-ranging systems in use today employ magnetostriction or piezoelectric devices for sound generation. Electromagnetic transducers, although useful in principle, are usually limited to low frequencies because of the sizeable masses involved and the difficulty of designing efficient magnetic circuits for high frequency use. As a result such devices have not been widely applied. Other factors which must be considered in designing an underwater sound transducer are the efficiency with which applied energy is converted to compressional wave energy, the range of wavelengths produced, the directivity pattern and the power handling capability.

The present invention provides a compressional wave transducer suitable for use in deep water. This transducer comprises a material (hereinafter referred to as a generator material or element) exhibiting a first-order solid-phase-to-solid-phase transition with maintenance of crystal symmetry accompanied by an abrupt change in saturation induction, means for maintaining said material under temperature conditions appropriate for said transition, means for imposing a varying magneic field on said material, the variation in field strength being sufficient to cause repetitive traversal of said transition, and resonator means coupled to said material for intensifying the pressure pulses resulting from said repetitive traversal. In a preferred embodiment, the varying magnetic field is provided by a combination of one or more electromagnets with one or more permanent magnets.

The invention is further detailed hereinafter with reference to the accompanying drawings, wherein:

FIG. I depicts the volume change resulting from traversal of the first-order solid-phase-to-solid-phase transition by a typical material employed as the generator element in the transducer at several temperatures;

FIG. II is a schematic diagram of an electromagnetically activated transducer according to the present invention;

FIG. III depicts in plan view a device employing permanent magnets;

FIG. IV is a sectional schematic view of one permanent magnet position in said device with the magnetic field applied to the material undergoing the first-order transition;

FIG. V is a similar view with the field shunted around the first-order transition material;

FIG. VI is a cross-sectional view of a transducer according to the present invention having the generator element positioned at the center of a spherical resonator;

FIG. VII is a graphical representation of a preferred type of current pulse for activating the transducer of FIG. VI;

FIG. VIII is a cross-sectional view of a transducer activated by a combination of a permanent magnetic field and an electromagnetic field;

FIG. IX is a series of graphical representations indicating the sequential changes in volume which occur in a typical generator element of the transducer of FIG. VIII.

Referring now in greater detail to FIG. I, which illustrates the behavior of a typical chromium-modified manganese antimonide, it is seen that the volume change associated with the first-order solid-phase-to-solid-phase transition in the generator material follows a typically S-shaped curve having an approximately linear section over the central 80% or so of transition. This section of the curve is that between the points designated A and B in FIG. I. The temperature associated with point A is designated as $T_o$. Application of high hydrostatic pressure to such a material will cause the first-order solid-phase-to-solid-phase transition to occur at a higher temperature as indicated by the curve passing through points A' and B'. The temperature $T_p$ is associated with point A' on the curve and the central approximately linear portion of the curve extends to point B'. It will be understood that for some material exhibiting the first-order solid-phase-to-solid-phase transition, pressure will cause the transition to occur at lower rather than higher temperatures. Such a material is manganese arsenide.

On the other hand, application of a magnetic field to the chromium-modified manganese antimonide causes it to transform at lower temperatures, as indicated by the curve passing through A'' and B''. Under adiabatic conditions this causes the material, initially at temperature $T_o$, to transform and to cool as a consequence of the latent heat associated with the first-order transition. Thus, application of a strong magnetic field to material initially in the state designated by the point A will cause the material to increase in volume and cool from temperature $T_o$ to temperature $T_F$ associated with the point designated B''. Of course, if a magnetic field is applied under isothermal conditions to a material initially at point A, the material will become magnetized and undergo an increase in volume without temperature change. As in the case of the pressure effect, the magnetic field effect for some generator materials occurs in the reverse sense from that described above.

From the foregoing, it is apparent that application of a magnetic field to the material employed as generator element in the compressional wave transducers of this invention causes the material to undergo a change in volume, the extent of the change being dependent on such factors as the applied pressure, the initial temperature of the material, and whether or not the magnetic field is applied under adiabatic or isothermal conditions. Demagnetization of the magnetized material brings about a volume change in the reverse sense with the result that the material can be cycled by repetitive application and removal of a magnetic field between two states differing in volume.

Application of this volume change in the production of a compressional wave in a liquid medium was demonstrated by the following example: A cylindrical generator element (¾" long by ⅜" diameter) composed of manganese-chromium antimonide, prepared as described below, was placed near the closed end of a tube (½" diameter), the portion of the tube in the vicinity of the generator element being of glass (10" long) and the remainder of the tube being of copper. The overall length of the tube was about 10 feet and the open end was turned up and terminated in a funnel through which water was introduced to fill the tube. An electrical heater was placed outside the tube around the generator element and a thermocouple was attached to the element for measureent of temperature. A coil, having an inside diameter 0.60" and a length of 2.0" and consisting of 200 turns number 16 copper wire wound in six layers, was aced around the generator element, tube and heater. his coil was energized by the discharge of a 90-joule, 000-volt condenser bank which, when discharged, yielded a damped oscillatory transient current wave generating in the coil a 49,000-oersted field at the first current ak, a 39,000-oersted field at the second peak, a 30,000-rsted field at the third peak, and a 24,300-oersted field the fourth peak. The frequency of the damped sinusoidal discharge was 2.0 kc. A hydrophone was immersed the water at a distance of 10' from the generator element. The hydrophone was attached to a storage oscilloope whose single sweep was triggered by the same pulse hich initiated the condenser discharge.

With the generator element at a temperature of 28°, i.e., near the transition temperature of the generator ement, acoustic signals were received by the hydrolone upon discharge of the condenser and were displayed on the oscilloscope screen. The signal frequency is double the field frequency since the volume of the nerator element increased irrespective of the polarity the field. The signal was slightly delayed commensute with the propagation velocity of sound down the water-filled tube. When the temperature of the generator ement was 15° C., i.e., well below the transition temrature, no acoustic signals were received by the hydrolone upon discharge of the condenser. Similarly, when e generator element was at 40° C., i.e., above the tranion temperature, no signal was received upon discharge the condenser.

The generator element employed was a manganesenromium antimonide containing 1.8998 Mn, 0.1000 Cr, 9499 Sb, and 0.0500 In on an atom basis and having a nsition temperature in zero field (midpoint of transi)n) at 36° C. The transition range was 34° C. (10% nsformed) to 38° C. (90% transformed). There was of thermal hysteresis in the transformation. This element was prepared by melting manganese, chromium, timony and indium in the indicated proportions tother for 3 hours at 1100° C. The melt was quenched by uring into a copper mold cooled in ice water, and the sultant polycrystalline solid annealed at 850° C. for 1 ur followed by cooling to room temperature at a rate 30° C./hour.

As indicated above, if the temperature of the generar material differs substantially from the temperature which the first-order solid-phase-to-solid-phase transin occurs, no acoustic signal is produced. Moreover, en the temperature is below the transition temperature, ry much larger magnetic fields are required to bring out the transition. Accordingly for most efficient opation, it is desirable that the temperature of the matel be maintained at a value close to, preferably within 1° C. of the midpoint of the transition range. If deed, this may be accomplished by the provision of suita thermostating means, but it is preferable to select as e generator element a material having its first-order lid-phase-to-solid-phase transition slightly above the nperature to be encountered in use. It is convenient, erefore, to provide a number of interchangeable genator elements differing from one another in transition nperature from which to select a particular generator ement best suited for use under a particular set of temrature and pressure conditions.

There are four factors, in addition to the volume change curring in the generator element, which must be conered in connection with the magnetic field requirements the compressional wave transducers of the present inntion. These factors are the effect of hydrostatic prese (discussed above), the adiabatic cooling, the transin range, and the hysteresis. Transition range and hysesis are related to the composition of the generator element and can be adjusted to desired values by appropriate choice of composition.

Adiabatic cooling can be reduced or eliminated by operating the generator element as closely as possible under isothermal conditions. One means of accomplishing this result is to use the generator material in a finely divided form immersed in a fluid preferably having high heat capacity, such as water. Other fluids which may be used are gasoline, lubricating oil, silicone oil and mineral oil. Under some circumstances it may be possible to arrange that the device operates under conditions such that the latent heat associated with a change in state of the high heat capacity fluid can also be employed. For example, with water, operation at 0° C. will permit the heat of fusion of ice to be applied to maintenance of isothermal conditions. It is desirable that the fluid employed should be a poor conductor of electricity to minimize eddy current losses and have a density-sound velocity product near that of the fluid in which compressional waves are to be produced.

A simple form of compressional wave transducer is illustrated schematically in FIG. II. This device consists of an iron core, 1, having a gap, 2, in which the generator material, 3, is positioned. The core is wound with a coil, 4, through which alternating current is passed. The generator material is surrounded by a resonator, 5, of suitable shape to provide the desired configuration in the compressional wave output. A thermostated resistance heater, 6, can be used to regulate the temperature of the generator material, 3.

When high fields are required, an air core solenoid is preferably employed to drive the generator element which is axially positioned therein. Such an arrangement is employed in the device illustrated in FIG. VI. Alternating or pulsed current is, of course, used to energize the solenoid.

Since magnetic fields are more efficiently obtained with permanent magnets than with solenoids and wound cores, it is preferred that at least a portion of the magnetic field be supplied by one or more permanent magnets. When permanent magnets are employed, variation in the magnetic field may be obtained by a system of movable pole pieces and shunts or by superposition of a variable electromagnetic field on the permanent field, as described more fully below.

FIG. III is a plan view depicting four permanent magnets mounted adjacent to a ring gear 12. The ring gear is mounted to rotate about its axis and is driven by the small gear, 13. Around the circumference of the ring gear are spaced pole pieces, 14, and shunts, 15, which, upon rotation of the gear are alternately positioned between the poles of the magnets, 11. The arrangement when pole pieces and shunts, respectively, are between the magnetic poles and the generator material, 16, is depicted in FIGS. IV and V. As the pole pieces and shunts alternately occupy the space between the magnetic poles, the magnetic field applied to the generator material, 16, alternates correspondingly between a maximum value when the pole pieces are in position and a minimum value when the shunts are in position. The frequency of this alternation depends upon the number of pole pieces and shunts and on the speed of rotation of the ring gear. The frequency of alternation is readily controlled from very low values ranging as low as few cycles per second to values of several hundred cycles per second. A thermostated resistance heater, 17, can be employed to regulate the temperature of the generator material, 16. In FIGS. III, IV and V the resonator means has been omitted; however, it will be understood that such means is necessary for efficient transmission of the compressional wave to the liquid medium. Obviously a compressional wave transducer could also be constructed in which magnets were rotated by the ring gear while the generator element and any field guides necessary remained stationary.

The resonator means employed in the compressional wave transducers of the present invention is constructed in accordance with known principles to provide the desired conditions for optimum energy transfer from the generator element to the surrounding liquid. One type of resonator, sometimes necessitated by the mechanical arrangement of other parts of the compressional wave transducer, can be referred to as an underwater organ pipe. This cylindriial type is depicted in part in FIG. II. Such a resonator is, of course, unsymmetrical, the material exhibiting the first-order solid-phase-to-solid-phase transition being located axially within the cylinder.

A preferable form of volume resonator is a cylindrical or spherical elastic shell symmetrically placed with respect to the generator material. The space inside the shell around the generator material is completely filled with a liquid, such as water, lubricating oil or silicone oil, and the system is so designed with respect to dimensions, mass and elasticity of shell and filling liquid that mechanical resonance at the desired frequency is obtained. The filling liquid preferably should have a compressibility no higher than that of water.

Such a system is depicted in FIG. VI, wherein the generator element 21 is surrounded by a coil 22 and is mounted at the center of a spherical resonator 25 suitably constructed of steel or other dense elastic material. The coil is provided with leads 23 which pass through seals 24 in the resonator wall to provide for the supply of electric energy to the coil. The space between the resonator shell 25 and the generator element 21 and coil 22 is filled with a liquid. A preferred type of wave form for the electrical power supplied to the coil of FIG. VI is depicted in FIG. VII. A thermostated resistance heater, 26, can be employed to regulate the temperature of the generator element, 21.

In a preferred apparatus embodiment of this invention, a combination of a permanent magnetic field and a variable electromagnetic field is employed to activate the generator element. In this embodiment, the provision of a continuous permanent magnetic bias permits the transition to be shifted either to higher or to lower temperatures by the superposed electromagnetic field, and enables use to be made of hysteresis effects in the generator element. By this means, the element is rendered bistable, i.e., it can exist in a high volume or a low volume state at a given temperature and can be flipped from one state to the other by application of a very short field pulse. A device constructed in accordance with this embodiment is illustrated in cross-sectional view in FIG. VIII.

In FIG. VIII, generator material 31 is mounted between permanent magnetic poles 32 having pole pieces 33. A coil 34 is positioned around the generator material so that, depending on the direction of curent flow, the field of the coil opposes or is additive with the field of the permanent magnet. For example, using a permanent magnet having a field strength of 10,000 oersteds, with a coil operating under conditions also producing a field strength of 10,000 oersteds, the field to which the generator material is exposed can be varied between 0 and 20,000 oersteds. A thermostated resistance heater, 35, may be employed to regulate the temperature of the generator material, 31.

The principle of operation of the embodiment illustrated in FIG. VIII can be more clearly appreciated by reference to the curves of FIG. IX. These curves indicate the relationship between volume change and temperature for the generator material under several field conditions. It will be noted that a small hysteresis occurs in the response of the generator material and that the volume change at a particular temperature depends upon whether the temperature is approached from higher or lower temperatures. This effect is found at least in minor degree in all generator materials.

In A of FIG. IX, conditions are represented with the generator material, having a volume $P_1$, in the field of the permanent magnet alone at a temperature represented by the dotted line. When the total field on the generator material is substantially increased such as by passing a current through the coil of FIG. VIII, the transition is caused to occur at a lower temperature and the net effect is as depicted in B of FIG. IX, with the generator material now in the volume state indicated by $P_2$. When passage of current through the coil is discontinued, the field returns to that of the permanent magnet alone and conditions are as indicated in C, with the generator material in volume state $P_3$. Current is now passed through the coil in the opposite sense so that the coil field opposes the field of the permanent magnet. In the reduced field so produced the transition in the generator material occurs at a higher temperature and the volume condition is as indicated at $P_4$ of D. When the current is again stopped, conditions return to those depicted in A with the generated material at $P_1$, thus completing a cycle between small volume and large volume states. It will be observed that the complete cycle requires two current pulses for the change from small to large volume and back. These can be of very short duration, however, so that energy consumption is low.

The substances employed as generator elements in the compressional wave transducers of this invention are possessed of the characteristic of abruptly changing in a controllable manner their saturation induction with changing temperature from a non-magnetic to a magnetic state in the course of the first-order transition from one solid state phase to a second solid state phase. This change in phase occurs with no change in crystal symmetry. It is preferred that this change be from an anti-ferromagnetic state on the one hand to a ferromagnetic or ferrimagnetic state on the other. This characteristic is in addition to normal Curie point or Néel point behavior of these substances.

A first-order transition, also known as a transition of the first kind, is one in which a discontinuity occurs in the first derivatives of the Gibbs free energy. For example, there are discontinuities in the first derivative with respect to temperature, i.e., entropy, with respect to pressure, i.e., in volume, and for a magnetic material with respect to magnetic field, i.e., in magnetization.

A second-order transition is one in which the second derivative of the free energy function is discontinuous but the first derivative is continuous. In other words, at a second-order transition energy, volume, and in a magnetic substance magnetization change continuously but the temperature derivatives of these quantities have singularities. The Curie point in a magnetic material is an example of a second-order transition.

Further discussion of first and second order transitions is found in Swalin, "Thermodynamics of Solids," John Wiley & Sons, Inc., New York, 1962, pp. 72–73 and in "Phase Transformations in Solids" (Symposium at Cornell University, Aug. 23–28, 1948), John Wiley & Sons, Inc., New York, 1951, chap. I, by L. Tisza, pp. 1 and 2. Quotations from these references are given below:

Swalin:

"If a transition occurs with a discontinuity in . . . first derivatives of the free energy, it is called a *first order transition.*"

"If . . . a transformation is discontinuous in its second derivatives of the free energy function, it would be identified as second order."

"The transformation from the ferromagnetic to the paramagnetic state is considered as an example of a second order transition."

Tisza:

"It is well known that there are two kinds of phase transitions: the first kind, called also of first order, in which energy, volume, and crystal structure change discontinuously; the second kind, frequently called . . . Curie points . . . in which energy and volume change continuously, but the temperature derivatives of these quantities have singularities."

As defined in the "International Dictionary of Physics and Electronics," Van Nostrand, second edition, copyrighted in 1961, the Néel temperature is the transition temperature for an antiferromagnetic material, at which maximal values of magnetic susceptibility, specific heat, and thermal expansion coefficient occur.

Among compositions useful as generator elements of this invention are compositions as more fully described in copending U.S. Patent application Ser. No. 181,744, filed Mar. 22, 1962, now Patent No. 3,126,347 by T. J. Svoboda, which contain at least two transition elements selected from Groups V–B, VI–B, and VII–B of the Periodic Table, of which at least one is taken from the first row of said transition elements, and at least one element of Group V–A selected from As, Sb and Bi, and which are further characterized by having a maximum saturation induction at a temperature above 0° K. but below the Curie point of the composition.

In these compositons, said Group V–A element(s) constitutes 5–40 atom percent of the whole and will generally be in the range of 5–35 atom percent. It will be understood that at least one Group V–A element of the group consisting of arsenic, antimony and bismuth, is always present in the compositions. Nitrogen and phosphorus may also be present. Of the remaining components, the transition metals of Groups V–B, VI–B and VII–B of the Periodic Table, i.e., at least two of V, Cr, Mn, Nb, Mo, Ta, W and Re, of which at least one is selected from V, Cr and Mn, constitute from 35–95 atom percent, any other element present being a metal from Groups II–IV of the Periodic Table in an amount of not more than 30 atom percent. Suitable examples of such other elements are cadmium, gallium, indium, lead, thallium, tin, zirconium, scandium, yttrium, magnesium and zinc. Ordinarily one of the transition metals enumerated above will constitute the major proportion of the transition metal content of the composition while the second transition metal will be present in minor proportion. However, in no case will the content of the second transition metal be less than 0.1 atom percent based on the total composition.

The Periodic Table referred to herein is the one appearing in Deming's "General Chemistry," John Wiley Sons, Inc., 5th ed., chap. 11.

Compositions which are particularly useful as generator elements contain antimony, manganese, and at least one additional transition metal, particularly chromium, vanadium, molybdenum or niobium, and optionally one or more additional elements selected from the group consisting of indium, cadmium, lead, zirconium, tin, gallium, thallium, scandium, yttrium, magnesium and zinc.

Examples of useful compositions are those containing antimony, 5–40 atom percent; manganese, 35–91.9 atom percent; at least one element of the group chromium and vanadium, 0.1–38.5 atom percent; and optionally an element of the group cadmium, gallium, indium, lead, thallium, tin, zirconium, scandium, yttrium, magnesium and zinc, 0–30 atom percent, the percentage values being so chosen as to total 100%.

Other useful compositions contain antimony, 5–35 atom percent; manganese, 25–75 atom percent; at least one element of the group molybdenum and niobium, 0.1–50 atom percent; and optionally an element of the group cadmium, gallium, indium, lead, thallium, tin, zirconium, scandium, yttrium, magnesium and zinc, 0–30 atom percent.

The foregoing compositions can be described by the formula $Mn_aX_bZ_cSb_d$, where X is chromium, vanadium, molybdenum, or niobium; Z is indium, cadmium, gallium, lead, thallium, tin, zirconium, scandium, yttrium, magnesium or zinc; and $a$, $b$, $c$, and $d$ are the atomic proportions of the elements employed and are chosen so as to provide percentage compositions in the ranges stated above. Compositions, in which X and/or Z represent a combination of two or more elements, can also be employed in the devices of this invention.

Particularly useful compositions are those containing 53.5–91.9 atom percent manganese, 8–35 atom percent antimony, and 0.1–38.5 atom percent of an additional element of the group chromium, vanadium and mixtures thereof. These compositions can be described by the formula $Mn_aX_bSb_d$, where X is chromium and/or vanadium, and $a$, $b$, and $d$ are the above indicated atomic proportions of the elements, $a$, $b$, and $d$ totalling 1. Especially useful compositions have the formula $Mn_{2-x}X_xSb$, where $x$ is 0.003–0.41, it being understood that the sum of the subscripts to Mn, X and Sb is 3.

Other useful compositions are those containing antimony, 5–35 atom percent; manganese, 35–70 atom percent; at least one element of the group chromium and vanadium, 0.8–25 atom percent; and an element of the group cadmium, gallium, indium, lead, thallium, tin, zirconium, scandium, yttrium, magnesium and zinc, 0–30 atom percent, the percentage values being so chosen as to total 100%.

Iron-rhodium alloys and iron-rhodium alloys containing up to 20 atom percent of at least one other element are also useful as generator elements in this invention. Suitable alloys include those described by Fallot, Revue Scientifique 77, 498 (1939); Kouvel et al., General Electric Research Report No. 61-RL-2870M; copending U.S. applications Ser. Nos. 177,229, now Patent No. 3,140,941 and 177,230, filed Mar. 5, 1962, now Patent No. 3,140,942 by P. H. L. Walter; application Ser. No. 192,060, filed May 3, 1962, now Patent No. 3,144,325 by P. H. L. Walter; and application Ser. No. 192,059, filed May 3, 1962, now Patent No. 3,144,324 by T. A. Bither. These magnetic compositions consist essentially of iron and rhodium in major proportion and at least one other metal in minor amount. The at least one other metal which also must always be present, will range in amount from 0.01–0.20 atom proportions. These magnetic compositions are alloys of the formula $$Fe_aRh_b[xM]_c$$

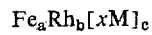

wherein M represents (1) at least one A-Group element selected from the group beryllium, magnesium, aluminum, gallium, indium, silicon, germanium, tin, lead, phosphorus, arsenic, antimony, bismuth, sulfur, selenium, and tellurium, i.e., a member of Group II–A of the Periodic Table of the elements of atomic number 4 to 12 or a member of Groups III–A, IV–A, V–A, VI–A of the Periodic Table of the elements of atomic number 13 through 83, inclusive, and $x$ is an integer from one to six and generally one to two; (2) at least one transition metal of atomic number 39–48 and 57–80, inclusive, other than rhodium, i.e., yttrium, zirconium, niobium, molybdenum, technetium, ruthenium, palladium, silver, cadmium, lanthanum, hafnium, tantalum, tungsten, rhenium, osmium, iridium, platinum, gold, and mercury, and $x$ is an integer from one to six and generally from one to two; (3) at least one transition metal of atomic number 21–30 inclusive other than iron, viz., scandium, titanium, vanadium, chromium, manganese, cobalt, nickel, copper, and zinc, and $x$ is an integer from one to six and generally one to two; or (4) at least one rare earth metal of the lanthanum or lanthanide series of the Periodic Table of the elements of atomic numbers 58–71, inclusive, viz., cerium, praseodymium, neodymium, promethium, samarium, europium, gadolinium, terbium, dysprosium, holmium, erbium, thulium, ytterbium, and lutetium, and $x$ is an integer from 1 to 14, and generally 1 to 3. In all these iron-rhodium compositions, $a$ and $b$, which can be alike or different, are numbers ranging from 0.8–1.2, and $c$ is a number ranging from 0.01–0.20, and in the instance when $x \geq 2$, the requisite $c$'s can be alike or different but still must fall in the indicated range. These subscript numbers refer to the atomic proportions of the elements in the final alloy. M can be different within the same defined group when $x$ is greater than 1.

Further compositions which can be employed in the compressional wave transducers of this invention contain manganese in an amount of at least 40 atom percent, a second metallic component selected from iron, cobalt, nickel, copper, and zinc, in an amount of 0.6–25 atom percent, and at least one of arsenic, antimony and bismuth in an amount of 25–40 atom percent. Additional components selected from the elements of Groups III–A, III–B, IV–A, and IV–B, nitrogen and phosphorus in an amount of 0–25 atom percent may also be present. These compositions are described more fully in copending U.S. patent application Ser. No. 66,194, filed Oct. 31, 1960, now Patent No. 3,126,345 in the name of T. J. Swoboda.

Still other compositions useful in the present invention are described in application Ser. No. 66,195, filed Oct. 31, 1960, now Patent No. 3,126,346, in the name of T. A. Bither. These compositions contain a single transition metal selected from vanadium, chromium, manganese, iron, cobalt, or nickel in an amount of 61–75 atom percent, and from 25–39 atom percent of at least two elements selected from gallium, germanium, selenium, tellurium, arsenic, antimony and bismuth, of which at least the major atom percent consists of arsenic, antimony, and/or bismuth.

Other useful compositions are represented by the formula $Mn_{2-x-y}T'_xT''_ySb_zIn_a$ where $T'$ is chromium and/or vanadium, $T''$ is one or more of iron, cobalt, nickel and copper, $x$ is 0.003–0.25, $y$ is 0.003–0.25, $z$ is 0.50–1.00 and $a$ is 0–0.50. These compositions are more fully described in application Ser. No. 261,784 of W. W. Gilbert and T. J. Swoboda, filed Feb. 28, 1963, now Patent No. 3,241,952.

Processes for preparing compositions useful in generator elements of this invention are described in the foregoing applications and in application Ser. No. 120,679 of W. W. Gilbert filed June 29, 1961, now Patent No. 3,196,055.

It is desirable, of course, that the first-order solid-phase-to-solid-phase transition produce a large change in volume in the generator element. The temperature at which the transition occurs is affected by changes in composition of the magnetic phase and can be adjusted to suit a particular device. The most useful compositions exhibit a saturation induction below the transition temperature, which is not more than about $\frac{1}{10}$ of the maximum saturation induction above this temperature.

As previously indicated, the transducers of this invention are especially useful as sonar projectors in the detection and location of objects submerged in deep water. When the transducer is energized momentarily by a train of pulses, preferably electrical, it transmits or radiates a corresponding short train of pulses of sonic energy into the water. When these pulses of sound energy strike the surface of a submarine, or any other sound-reflecting object, they are reflected and travel back through the water to a detecting apparatus, thereby indicating the presence of the submarine or other underwater object.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compressional wave transducer comprising:
   (a) a material exhibiting a first-order solid-phase-to-solid-phase transition with maintenance of crystal symmetry accompanied by an abrupt change in saturation induction;
   (b) means for maintaining said material under temperature conditions appropriate for said transition;
   (c) means for imposing a varying magnetic field on said material, the variation in field strength being sufficient to cause repetitive traversal of said transition; and
   (d) resonator means coupled to said material for intensifying the pressure pulses resulting from said repetitive traversal.

2. A transducer of claim 1 wherein the means for imposing the magnetic field consists of a combination of a permanent magnetic field and a variable electromagnetic field.

3. A transducer of claim 1 in which the temperature of the material exhibiting the first-order solid-phase-to-solid-phase transition is maintained within 10° C. of the midpoint of the transition range.

4. A transducer of claim 1 in which the material exhibiting the first-order solid-phase-to-solid-phase transition is in a finely divided form immersed in a fluid of high heat capacity and low electrical conductivity.

5. A transducer of claim 1 in which the resonator is a spherical elastic shell symmetrically placed with respect to the material exhibiting the first-order solid-phase-to-solid-phase transition.

6. A transducer of claim 1 having the material exhibiting the first-order solid-phase-to-solid-phase transition located within a cylindrical resonator.

7. A transducer of claim 1 in which the material exhibiting the first-order solid-phase-to-solid-phase transition is manganese chromium antimonide.

8. A compressional wave transducer comprising a generator material exhibiting a first-order solid-phase-to-solid-phase transition with maintenance of crystal symmetry accompanied by an abrupt change in saturation induction, said generator material being surrounded by a coil through which alternating electric current is passed and mounted in the center of a spherical elastic shell-type resonator symmetrically placed to provide suitable configuration in the compressional wave output, the space between the resonator shell and the generator material being filled with a fluid of high heat capacity.

9. A method for sending sonic waves through water which comprises:
   (1) alternatively applying and removing a magnetic field to and from a material exhibiting a first-order solid-phase-to-solid-phase transition with maintenance of crystal symmetry accompanied by an abrupt change in saturation induction, while maintaining said material under temperature conditions appropriate for said transition, and
   (2) resonating the pressure pulses emanating as a result of Step 1.

10. The method of claim 9 wherein the magnetic field is applied and removed by changes in an electrical current supplied to a coil.

11. Apparatus for generating sonic signals comprising:
   (1) a material characterized by having a first-order solid-phase-to-solid-phase transition;
   (2) means for imposing a varying magnetic field on said material, the variation in field strength being sufficient to cause repetitive traversal of said transition with associated abrupt changes in the specific volume of said material;
   (3) a closed vessel enclosing said material and providing a space between said material and a wall of said vessel;
   (4) a sonic shock-transmitting fluid in said vessel filling the space between said material and said wall of said vessel.

12. A compressional wave transducer comprising a generator material exhibiting a first-order solid-phase-to-solid-phase transition with maintenance of crystal symmetry accompanied by an abupt change in saturation induction, said generator material being surrounded by a coil through which electric current pulses are passed and mounted in the center of an annular elastic shell-type sonator symmetrically placed to provide suitable con-
uration in the compressional wave output, the space
tween the resonator shell and the generator material
ing filled with a fluid of high heat capacity.

13. A compressional wave transducer comprising a
nerator material exhibiting a first-order solid-phase-to-
lid-phase transition with maintenance of crystal sym-
₂try accompanied by an abrupt change in saturation in-
ction, said generator material being surrounded by a
il through which electric current pulses are passed and
ɔunted in a cylindrical elastic shell-type resonator and
:ated axially within said cylindrical resonator, the space
tween the resonator shell and the generator material
ing filled with a fluid of high heat capacity.

14. A compressional wave transducer comprising a
nerator material exhibiting a first-order solid-phase-
-solid-phase transition with maintenance of crystal sym-
₂try accompanied by an abrupt change in saturation in-
duction, said generator material being surrounded by a
coil through which electric current pulses are passed and
mounted in a cylindrical elastic shell-type resonator sym-
metrically placed to provide suitable configuration in the
compressional wave output, the space between the reso-
nator shell and the generator material being filled with a
fluid of high heat capacity.

References Cited

UNITED STATES PATENTS 3,140,942   7/1964   Walter _____ 75—122

RODNEY D. BENNETT, *Primary Examiner.*

MAYNARD R. WILBUR, CHESTER L. JUSTUS,
*Examiners.*

J. P. MORRIS, *Assistant Examiner.*